US012473085B1

(12) United States Patent
Cai et al.

(10) Patent No.: US 12,473,085 B1
(45) Date of Patent: Nov. 18, 2025

(54) DEFORMABLE FLYING MACHINE

(71) Applicant: ZhiYong Cai, Linxiang (CN)

(72) Inventors: ZhiYong Cai, Linxiang (CN); LuYan Sun, Linxiang (CN)

(73) Assignee: ZhiYong Cai, Linxiang (CN)

( * ) Notice: Subject to any disclaimer, the term of this patent is extended or adjusted under 35 U.S.C. 154(b) by 0 days.

(21) Appl. No.: 18/820,529

(22) Filed: Aug. 30, 2024

(51) Int. Cl.
*B64C 27/52* (2006.01)
*B64C 27/59* (2006.01)

(52) U.S. Cl.
CPC ............. *B64C 27/52* (2013.01); *B64C 27/59* (2013.01)

(58) Field of Classification Search
CPC ...... B64U 10/14; B64U 30/297; B64U 40/20; B64C 29/0033; B64C 27/52
See application file for complete search history.

(56) References Cited

U.S. PATENT DOCUMENTS

| 2009/0290981 | A1* | 11/2009 | Gandhi | ................... B64C 27/46 416/1 |
| 2016/0347443 | A1* | 12/2016 | Lee | ...................... G05D 1/0011 |
| 2023/0236610 | A1* | 7/2023 | Lee | ......................... B64U 20/83 701/11 |
| 2023/0391465 | A1* | 12/2023 | Li | .......................... B64D 35/00 |
| 2024/0083604 | A1* | 3/2024 | Cohen | .................... B64U 10/14 |

* cited by examiner

*Primary Examiner* — Joshua D Huson
*Assistant Examiner* — Anna L. Gordon

(57) ABSTRACT

A transformable flying machine, including: a main body, a drive mechanism, and two lift system sets. The two lift system sets are arranged on both sides of the main body, and both the two lift system sets are rotatably connected to the main body. The drive mechanism is arranged on the main body, and the drive mechanism includes a driving member and a transmission member; the transmission member is rotatably connected to the two lift system sets, and the driving member is configured to drive the transmission member to move along a direction of a connecting line of centers of the two lift system sets, so as to drive the two lift system sets to rotate, for adjusting a tilt angle of the two lift system sets relative to the main body.

7 Claims, 7 Drawing Sheets

DEFORMABLE FLYING MACHINE

TECHNICAL FIELD

The present disclosure relates to the technical field of flying machines, and more specifically to a transformable flying machine.

BACKGROUND

With the development and improvement of drone technology, the cost of existing drones has been significantly reduced, making them more affordable. Further, due to easier operation and increased practicality, they are becoming more and more popular. More and more consumers are beginning to purchase and use drones to perform recreational activities such as flying, aerial photography, and live video streaming, etc. An existing toy drone generally includes a main body and a rotor assembly arranged on the main body. The rotor assembly is fixedly connected to the main body. The drone has a fixed shape when in flight, which cannot be deformed. Therefore, it has a monotonous appearance and flight mode, affecting its interest.

In view of this, the present disclosure proposes a transformable flying machine.

SUMMARY OF THE DISCLOSURE

A transformable flying machine, including: a main body; two lift system sets, arranged on both sides of the main body and rotatably connected to the main body; and a drive mechanism, arranged on the main body and including: a driving member and a transmission member; wherein the transmission member is rotatably connected to the two lift system sets, and the driving member is configured to drive the transmission member to move along an arrangement direction of the two lift system sets, so as to drive the two lift system sets to rotate, for adjusting a tilt angle of the two lift system sets relative to the main body.

In some embodiments, the transformable flying machine includes a transmission mating member;
each lift system set includes two rotor assemblies and a connecting rod connecting the two rotor assemblies; the transmission mating member is connected to the connecting rod; the transmission member is in a transmission connection with the transmission mating member, to drive the connecting rod to rotate.

In some embodiments, the transmission mating member includes a bushing and a first swing arm; the bushing is sleeved on the connecting rod, and the first swing arm is vertically connected to the bushing; the transmission member is connected to the first swing arm to drive the first swing arm to swing, driving the connecting rod to rotate.

In some embodiments, an end of the first swing arm is arranged with a first mating shaft parallel to the bushing; an end of the transmission member defines a first elongated groove; the first mating shaft is slidably inserted into the first elongated groove.

In some embodiments, a guide groove is defined on the main body, the guide groove extending in the arrangement direction of the two lift system sets; the transmission member passes through the guide groove, and the guide groove defines a sliding direction of the transmission member.

In some embodiments, the transmission member has a first position, a second position, and a third position; in a state where the transmission member moves to the first position, the two lift system sets tilt in a first direction relative to the main body; in a state where the transmission member moves to the second position, the two lift system sets tilt in a second direction relative to the main body; and in a state where the transmission member moves to the third position, the two lift system sets are parallel to the main body.

In some embodiments, the transformable flying machine further includes an elastic limit member, and the elastic limit member includes a first elastic arm and a second elastic arm; the transmission member includes a mating convex portion, and the mating convex portion extends between the first elastic arm and the second elastic arm; in the state where the transmission member moves to the first position, the first elastic arm is in an elastic deformation state; in the state where the transmission member moves to the second position, the second elastic arm is in an elastic deformation state; and in the state where the transmission member moves to the third position, the elastic limit member is in a deformation recovery state.

In some embodiments, a magnetic component is arranged on the transmission member; the driving member includes two electromagnets arranged on the main body, wherein the two electromagnets are arranged successively at intervals along an extension direction of the transmission member; upon one of the electromagnets being energized, the one of the electromagnets attracts the magnetic component, causing the transmission member to move to the first position; upon the other of the electromagnets being energized, the other of the electromagnets attracts the magnetic component, causing the transmission member to move to the second position; in a state where the two electromagnets are both not energized, the transmission member moves to the third position under an action of the elastic limit member.

In some embodiments, a rack is arranged on the transmission member; the driving member includes a motor and a gear connected to a rotor shaft of the motor, the gear meshing with the rack; a rotation of the motor is configured to drive the transmission member to move, so as to adjust the tilt angle of the two lift system sets relative to the main body.

In some embodiments, a second elongated groove is defined on the transmission member; the driving member includes a steering gear and a second swing arm; the second swing arm is connected to an output end of the steering gear, and the second swing arm includes a second mating shaft, the second mating shaft being slidably connected to the second elongated groove.

By adopting the above technical scheme, the present disclosure has the following beneficial effects:

The transformable flying machine can adjust the angle between the lift system and the main body to change the shape of the flying machine and to perform in-place flying maneuvers, which is highly interesting.

BRIEF DESCRIPTION OF THE DRAWINGS

The accompanying drawings are part of the present disclosure and are intended to provide further understanding of the present disclosure. The schematic embodiments of the present disclosure and corresponding description are intended to explain the present disclosure, but do not constitute an undue limitation of the present disclosure. Obviously, the accompanying drawings in the following description are just some of the embodiments. For those skilled in the art, other drawings can also be obtained without creative effort based on these drawings.

Figure 1:
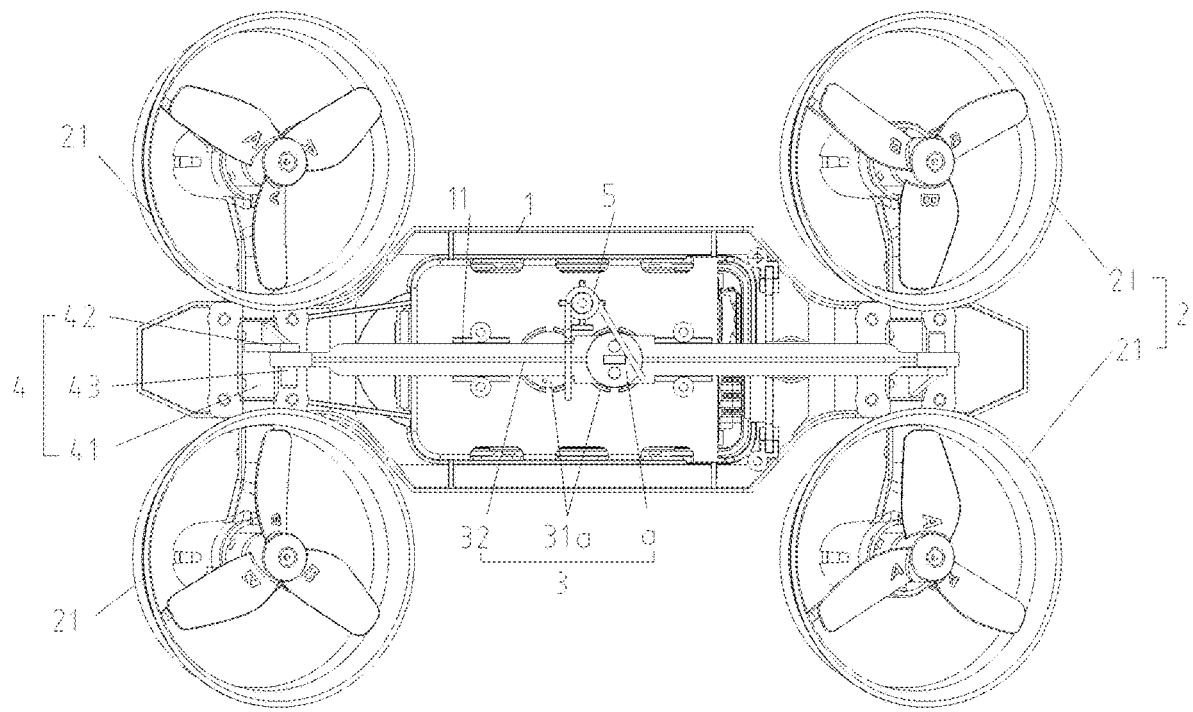
FIG. 1 is a top view of a transformable flying machine on the ground according to some embodiments of the present disclosure, where a transmission member moves to a first position.

REFERENCE NUMERALS 1, main body; 11, guide groove; 2, lift system set; 21, rotor assembly; 3, drive mechanism; 31a, electromagnet; 31b, motor; 31c, gear; 31d, steering gear; 31e, second swing arm; 32, transmission member; 321, first elongated groove; 322, mating convex portion; 323, rack; 324, second elongated groove; 4, transmission mating member; 41, bushing; 42, first swing arm; 43, first mating shaft; 5, elastic limit member; 51, first elastic arm; 52, second elastic arm; a, magnetic component.

It should be noted that these drawings and the text description do not seek to in any way limit the scope of the present disclosure, but rather to illustrate the concept of the present disclosure to those skilled in the art by reference to the embodiments.

DETAILED DESCRIPTION

To make the purpose, technical solution, and advantages of the embodiments of the present disclosure clearer, the following will clearly and completely describe the technical solutions of the embodiments, in combination with the appended drawings of the present disclosure. The following embodiments are intended to illustrate the present disclosure, but are not to limit the scope of the present disclosure.

In the description of the present disclosure, it is noted that the terms "top", "bottom", "inside", "outside" and other indications of orientation or positional relationships are based on the orientation or positional relationships shown in the accompanying drawings, which are provided for the convenience of describing the present disclosure and simplifying the description, and do not indicate or imply that the referred device or component must have a specific orientation or be constructed and operated in a specific orientation. Therefore, they should not be understood as limitations to the present disclosure.

In the description of the present disclosure, it is noted that unless otherwise expressly provided and limited, the terms "mounted" and "connected" should be understood in a broad sense. For example, they may refer to a fixed connection, a detachable connection, or a connection in one piece; they may refer to a mechanical connection or an electrical connection; they may refer to a direct connection or an indirect connection through an intermediate medium. For those skilled in the art, the specific meaning of the above terms in the disclosure can be understood in the specific context.

As shown in FIGS. 1 to 12, the embodiments of the present disclosure provide a transformable flying machine, including: a main body 1, a drive mechanism 3, and two lift system sets 2. The two lift system sets 2 are arranged on both sides of the main body 1, and both the two lift system sets 2 are rotatably connected to the main body 1. The drive mechanism 3 is arranged on the main body 1, and the drive mechanism 3 includes a driving member and a transmission member 32; the transmission member 32 is rotatably connected to the two lift system sets 2, and the driving member is configured to drive the transmission member 32 to move along an arrangement direction of the two lift system sets 2, so as to drive the two lift system sets 2 to rotate, for adjusting a tilt angle of the two lift system sets 2 relative to the main body 1.

The transformable flying machine of the present disclosure can adjust the angle between the lift system 2 and the main body 1 to change the shape of the flying machine and to perform in-place flying maneuvers, which is highly interesting.

Figure 10:
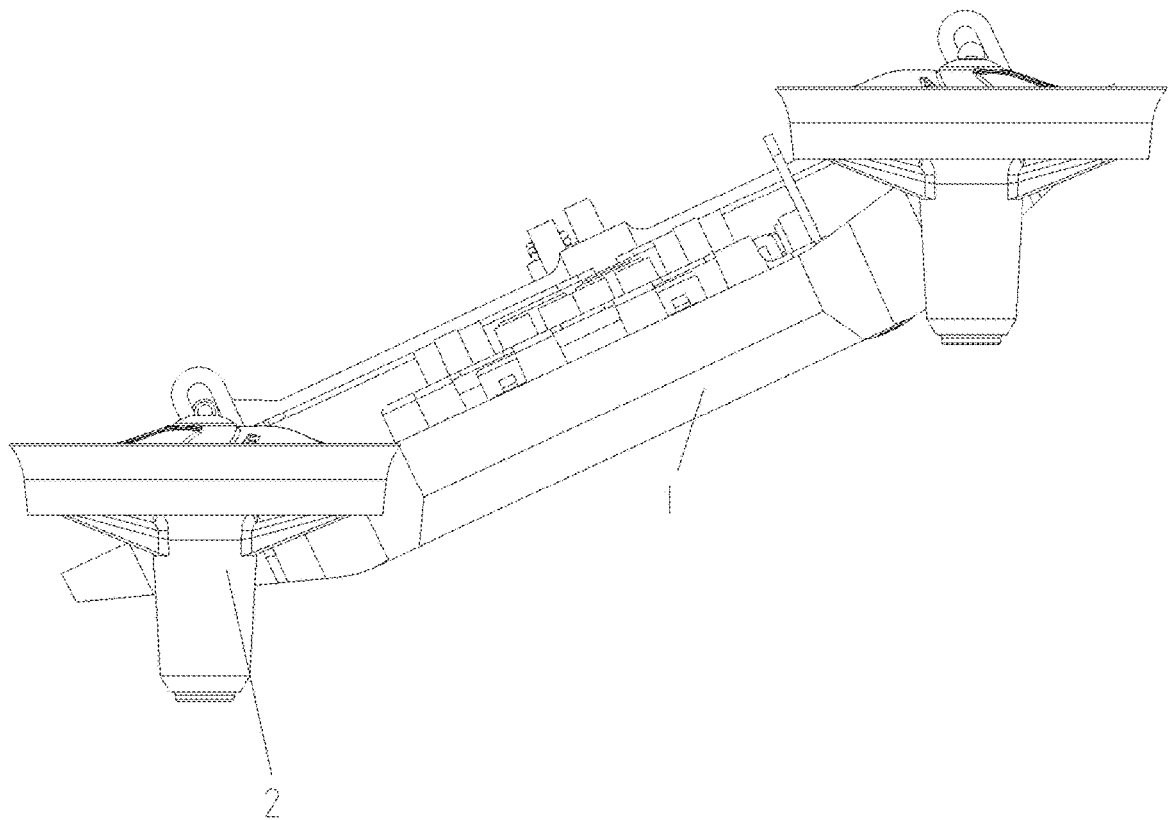
FIG. 10 is a side view of a transformable flying machine in the air according to some embodiments of the present disclosure, where a transmission member moves to a first position.
Figure 11:
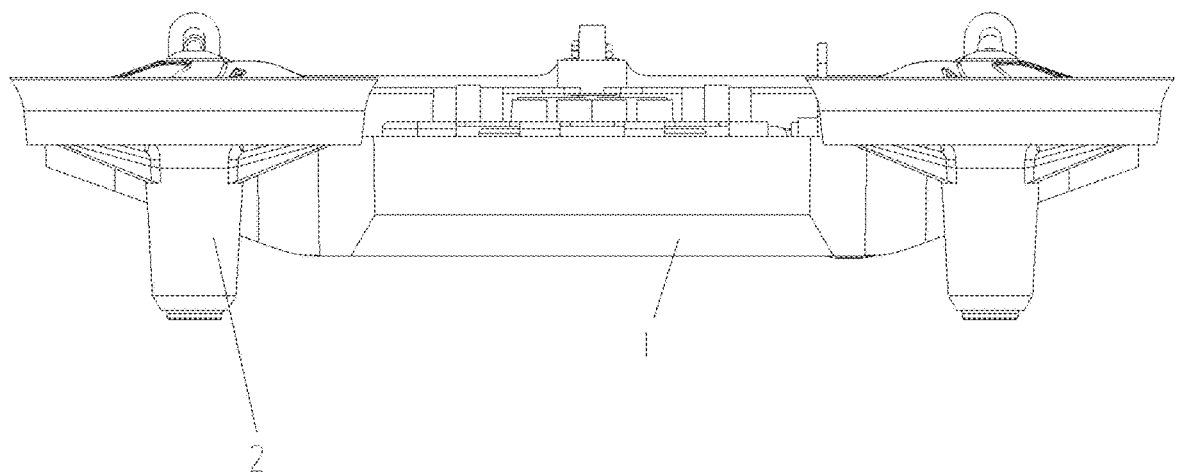
FIG. 11 is a side view of a transformable flying machine in the air according to some embodiments of the present disclosure, where a transmission member moves to a third position.
Figure 12:
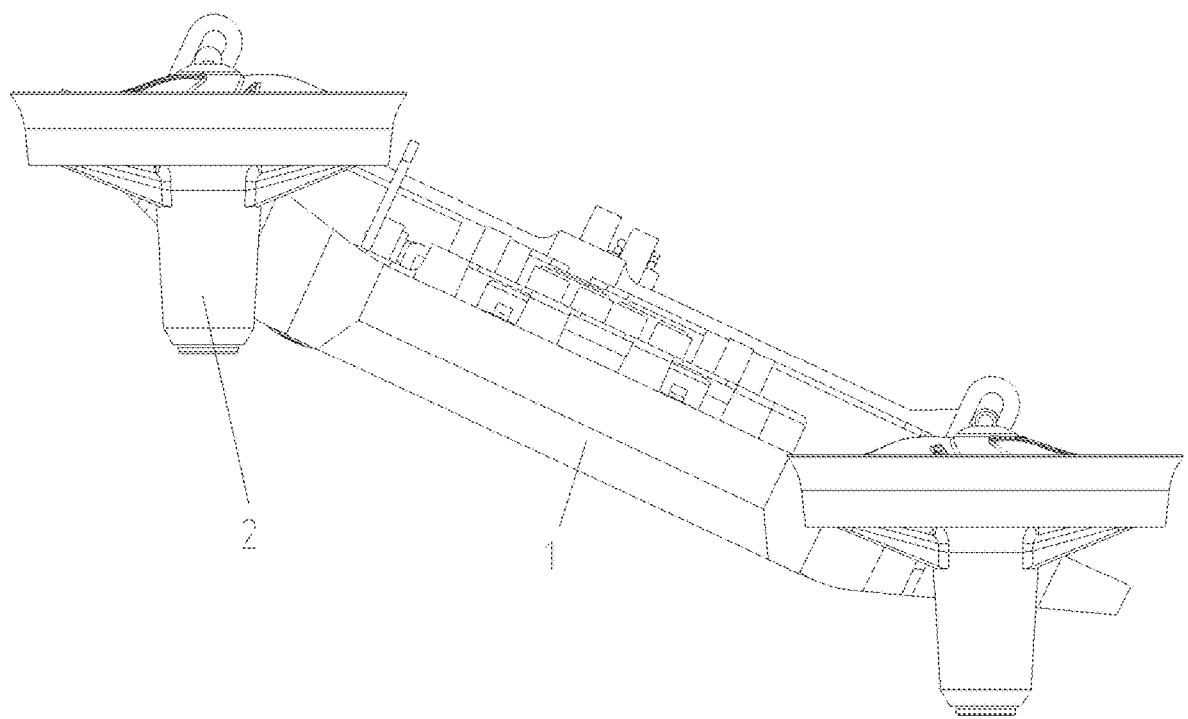
FIG. 12 is a side view of a transformable flying machine in the air according to some embodiments of the present disclosure, where a transmission member moves to a second position.

In an aerial flight mode, as shown in FIGS. 10 to 12, the drive mechanism 3 can drive each lift system set 2 to tilt relative to the main body 1 in a first direction, a second direction, or parallel to the main body 1. The above achieves a switching of three aerial postures. The successive switching of postures can make the drone fly with a visual effect of dancing in the air, which is extremely interesting.

Figure 2:
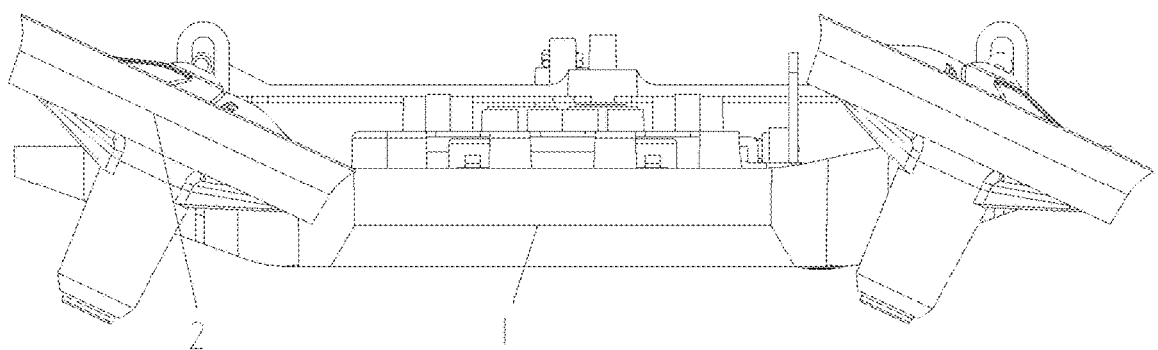
FIG. 2 is a side view of FIG. 1.
Figure 5:
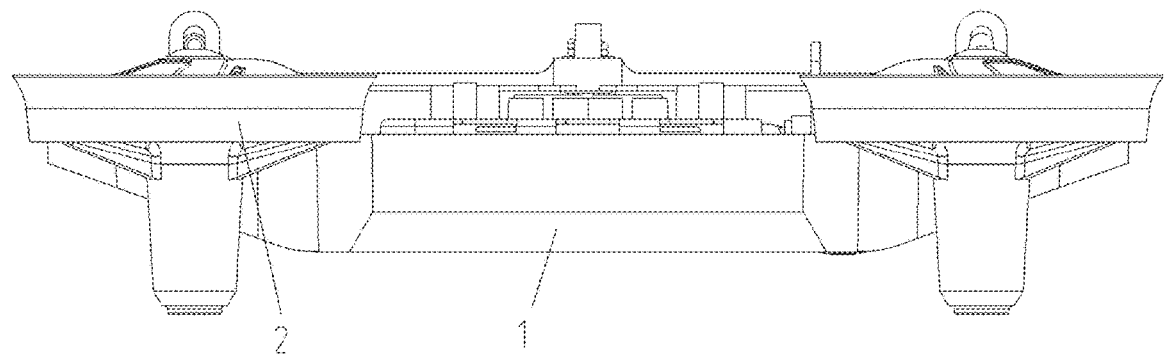
FIG. 5 is a side view of FIG. 3.
Figure 7:
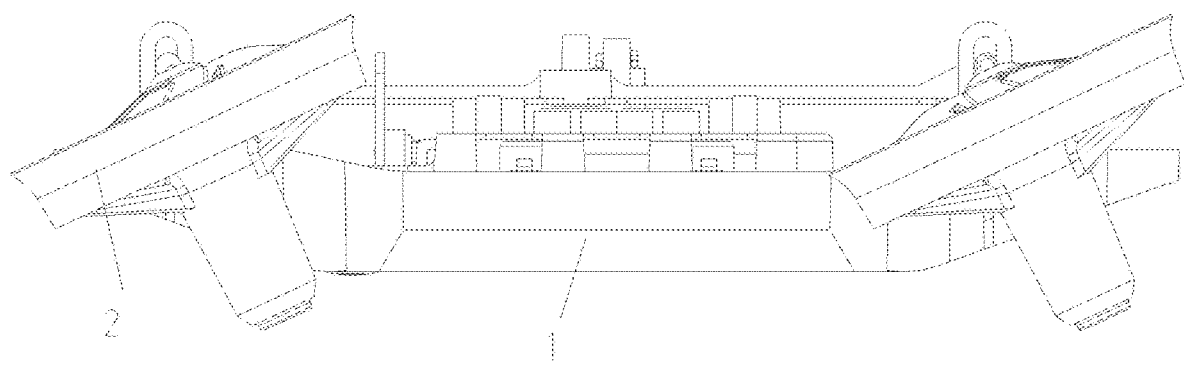
FIG. 7 is a side view of FIG. 6.

On the ground, as shown in FIGS. 2, 5 and 7, the drive mechanism 3 drives each lift system set 2 to tilt relative to the main body 1, and the lift system 2 tilts relative to the ground, such that the drone can skid forward and backward on the ground, skid while turning, and dance in place, which is highly ornamental and brings infinite fun to the player.

Figure 4:
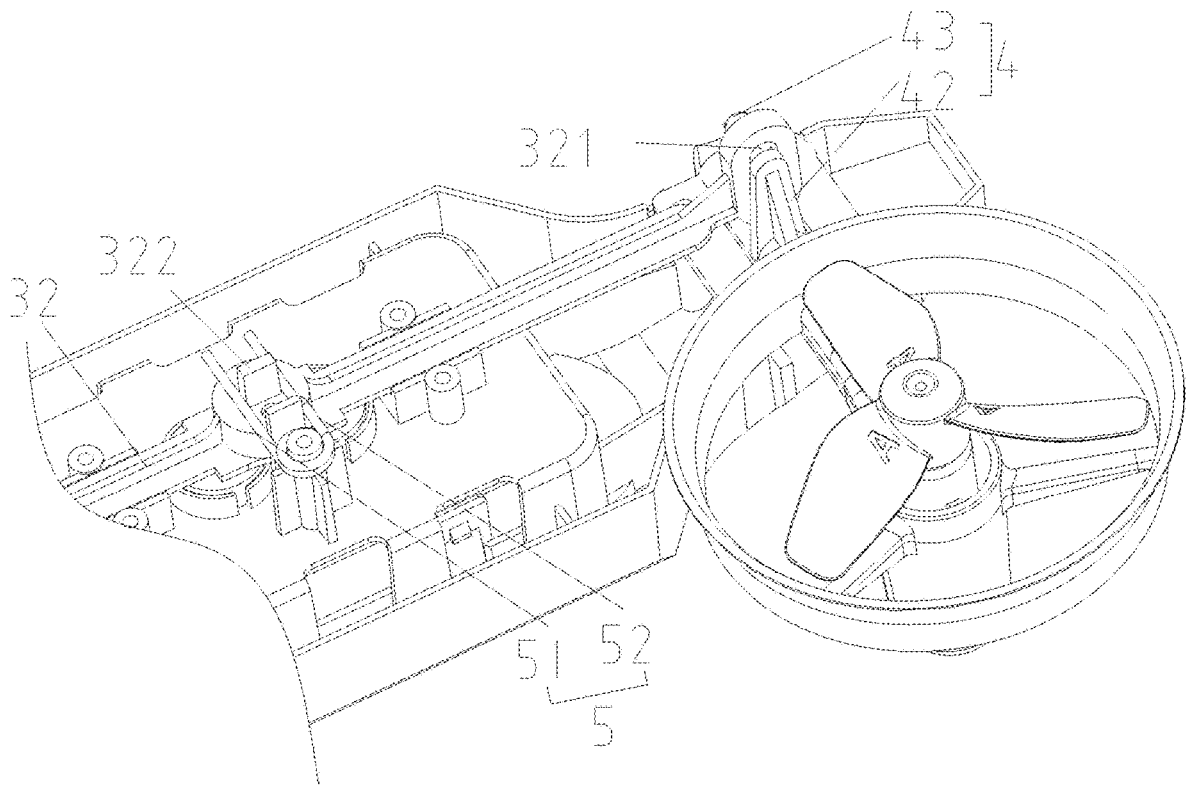
FIG. 4 is a partial schematic view of the three-dimensional structure in FIG. 3.

In some embodiments, as shown in FIGS. 1 and 4, the transformable flying machine includes a transmission mating member 4; each lift system set 2 includes two rotor assemblies 21 and a connecting rod connecting the two rotor assemblies 21; the transmission mating member 4 is connected to the connecting rod, and the transmission member 32 is in a transmission connection with the transmission mating member 4, to drive the connecting rod to rotate.

Specifically, the transmission mating member 4 includes a bushing 41 and a first swing arm 42; the bushing 41 is sleeved on the connecting rod, the first swing arm 42 is vertically connected to the bushing 41, and the transmission member 32 is connected to the first swing arm 42 to drive the first swing arm 42 to swing, driving the connecting rod to rotate.

An end of the first swing arm 42 is arranged with a first mating shaft 43 parallel to the bushing 41, and an end of the transmission member 32 defines a first elongated groove 321; the first mating shaft 43 is slidably inserted into the first elongated groove 321. The transmission member 32 translates and pushes the shaft, thereby driving the connecting rod and the rotor assembly 21 to rotate synchronously, and thus adjusting the angle between the rotor assembly 21 and the main body 1.

In some embodiments, a guide groove 11 is defined on the main body 1, the guide groove 11 extending in the arrangement direction of the two lift system sets 2. The transmission member 32 passes through the guide groove 11, and the guide groove 11 defines a sliding direction of the transmission member 32, thereby improving the reliability of the flying machine.

The transmission member 32 has a first position, a second position, and a third position. In a state where the transmission member 32 moves to the first position, the lift system sets 2 tilt in the first direction relative to the main body 1; in a state where the transmission member 32 moves to the second position, the lift system sets 2 tilt in the second direction relative to the main body 1; and in a state where the transmission member 32 moves to the third position, the lift system sets 2 are parallel to the main body 1. The first direction is opposite to the second direction, and the first direction and the second direction may both be the length direction of the main body 1.

Figure 3:
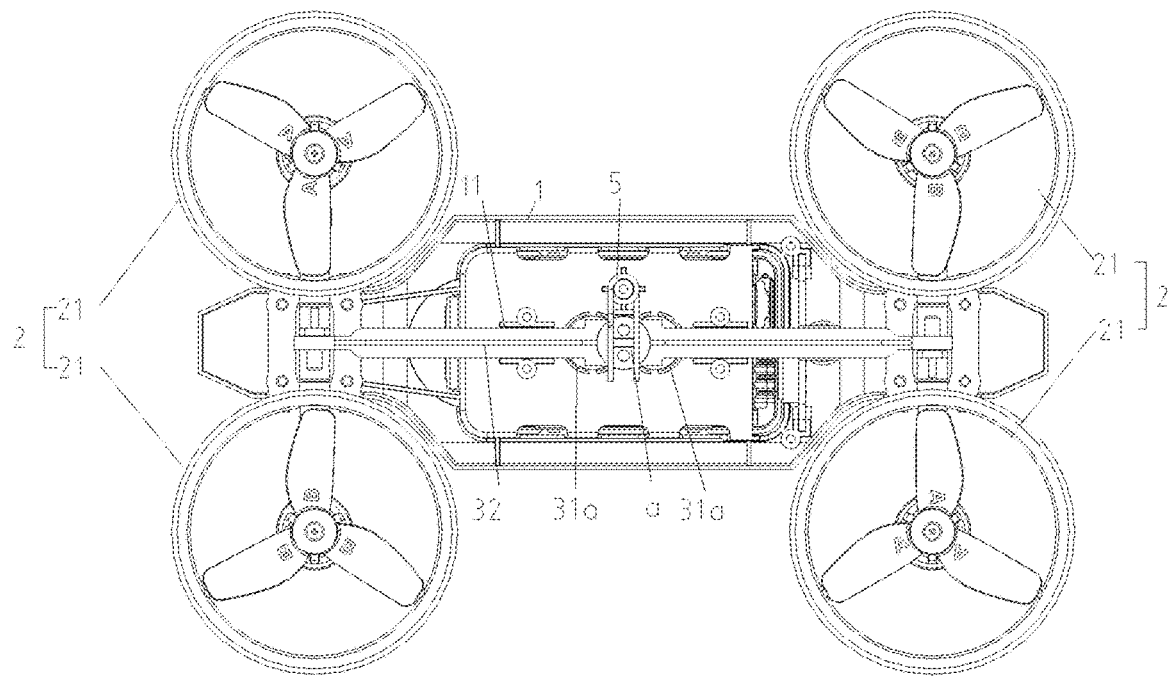
FIG. 3 is a top view of a transformable flying machine on the ground according to some embodiments of the present disclosure, where a transmission member moves to a third position.
Figure 6:
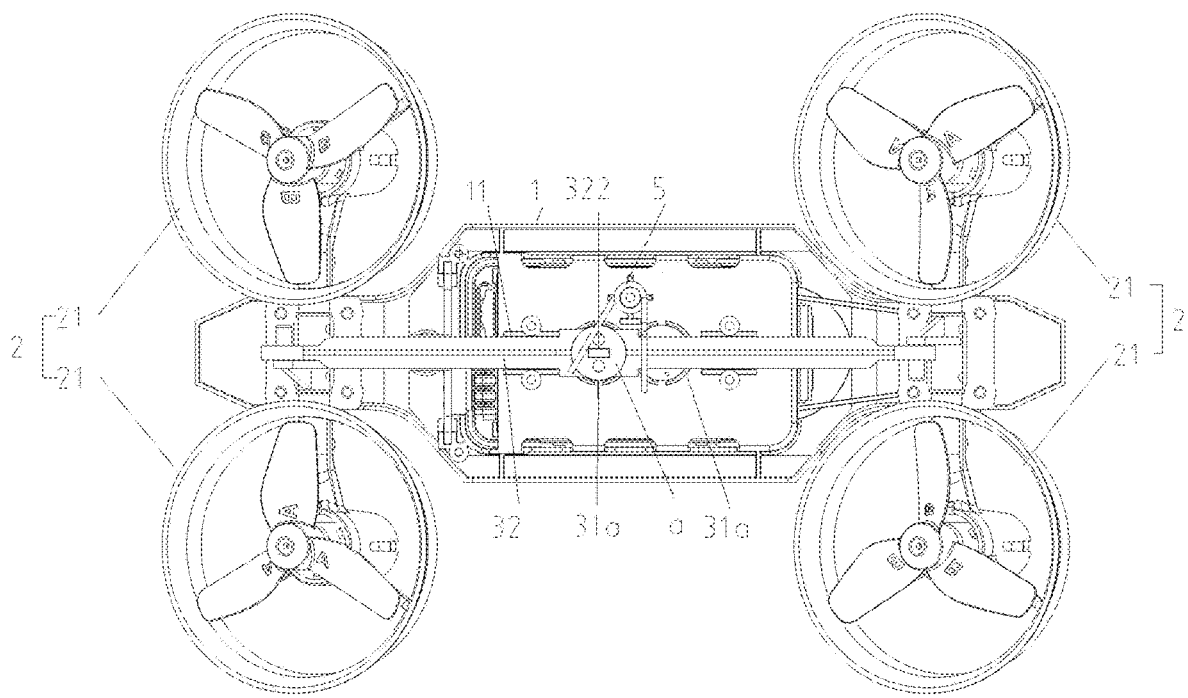
FIG. 6 is a top view of a transformable flying machine on the ground according to some embodiments of the present disclosure, where a transmission member moves to a second position.

The transformable flying machine further includes an elastic limit member 5, and the elastic limit member 5 may be a torsion arm spring. The elastic limit member 5 includes a first elastic arm 51 and a second elastic arm 52. The transmission member 32 includes a mating convex portion 322, and the mating convex portion 322 extends between the first elastic arm 51 and the second elastic arm 52. As shown in FIGS. 1 and 2, in the state where the transmission member 32 moves to the first position, the first elastic arm 51 is in an elastic deformation state. As shown in FIG. 6, in the state where the transmission member 32 moves to the second position, the second elastic arm 52 is in an elastic deformation state. As shown in FIGS. 3 and 4, in the state where the transmission member 32 moves to the third position, the elastic limit member 5 is in a deformation recovery state. The arrangement of the elastic arms causes the transmission member 32 to have a tendency to automatically reset to the third position.

The following provides three possible implementations for the drive mechanism 3.

First solution: As shown in FIGS. 1 to 6, a magnetic component a is arranged on the transmission member 32, where the magnetic component a may be a magnet; the driving member includes two electromagnets 31a arranged on the main body 1, where the two electromagnets 31a are arranged successively at intervals along an extension direction of the transmission member 32. Upon one of the electromagnets 31a being energized, the one of the electromagnets 31a attracts the magnetic component a, causing the transmission member 32 to move to the first position. Upon the other of the electromagnets 31a being energized, the other of the electromagnets 31a attracts the magnetic component a, causing the transmission member 32 to move to the second position. In a state where both the electromagnets 31a are not energized, the transmission member 32 moves to the third position under the action of the elastic limit member 5.

Figure 8:
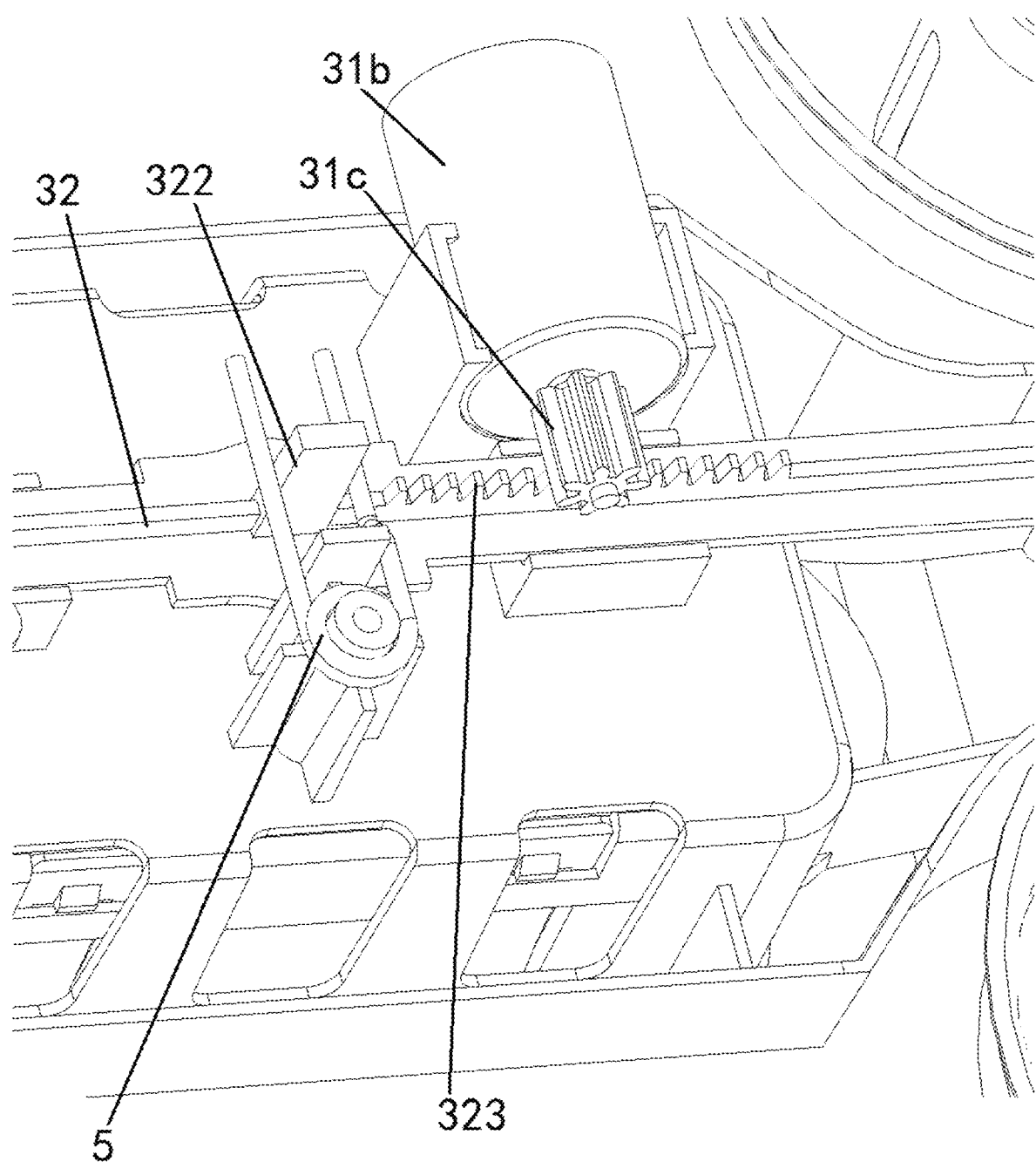
FIG. 8 is a schematic view of a transformable flying machine according to some embodiments of the present disclosure, where a transmission member is adopted with a motor.

Second solution: As shown in FIG. 8, in addition to the solution using an electromagnet 31a, the present disclosure further provides a solution using a gear 31c and a rack 323. For example, a rack 323 is arranged on the transmission member 32, and the driving member includes a motor 31b and a gear 31c connected to a rotor shaft of the motor 31b, the gear 31c meshing with the rack 323. The rotation of the motor 31b can drive the transmission member 32 to move so as to adjust the tilt angle of the two lift system sets 2 relative to the main body 1.

Figure 9:
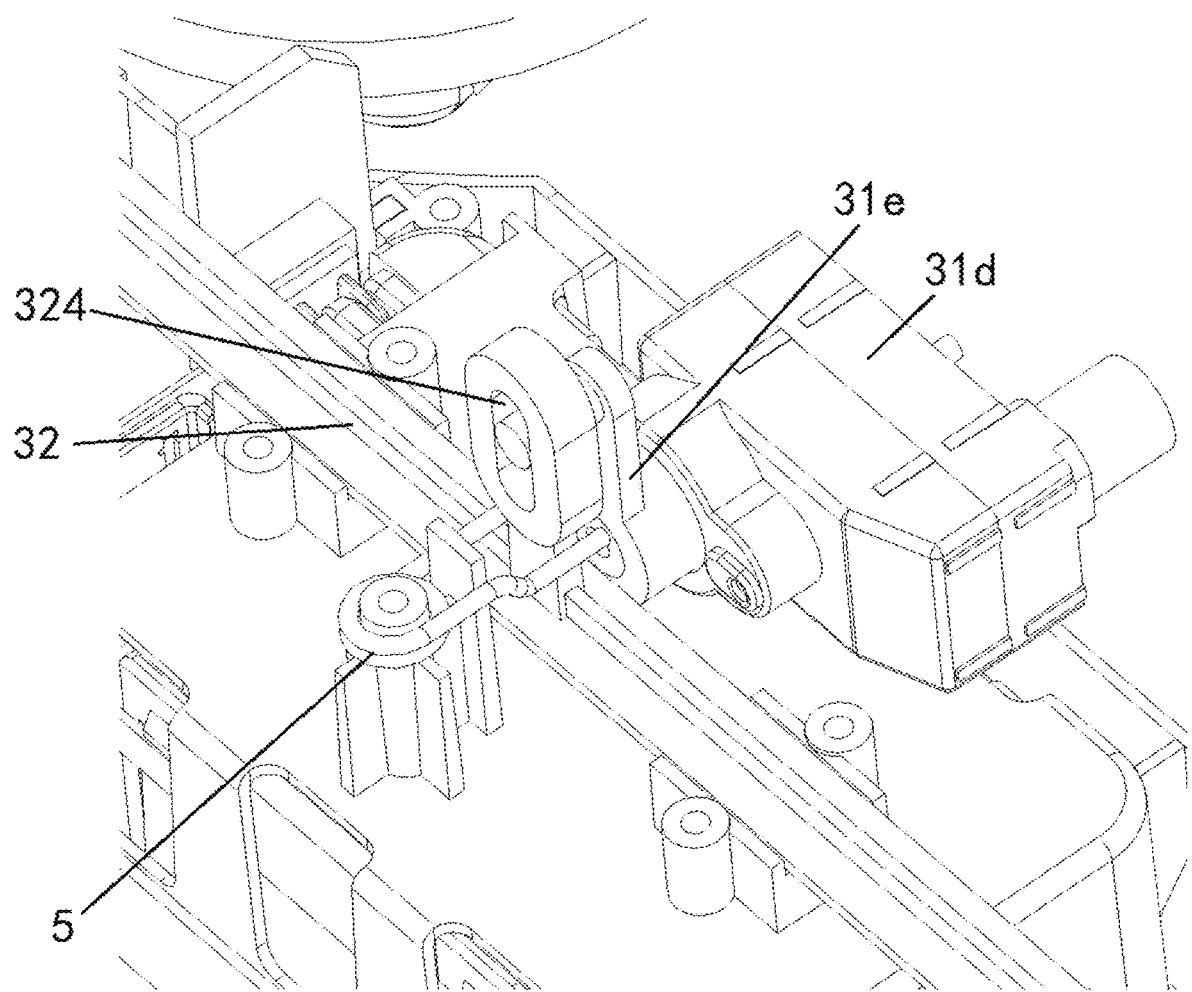
FIG. 9 is a schematic view of a transformable flying machine according to some embodiments of the present disclosure, where a transmission member is adopted with a steering gear.

Third solution: As shown in FIG. 9, a second elongated groove 324 is defined on the transmission member 32, and the driving member includes a steering gear 31d and a second swing arm 31e. The second swing arm 31e is connected to an output end of the steering gear, and the second swing arm 31e includes a second mating shaft, the second mating shaft being slidably connected to the second elongated groove 324. In this solution, the angular displacement of the steering gear 31d is applied to drive the transmission member 32 to achieve precise positioning of the transmission member in any position. The steering gear 31d may have its own clutch to prevent improper manual operation. The precise change of the three postures of the drone can be achieved by rotating the steering gear 31d in the forward and reverse directions.

The above is only some embodiments of the present disclosure, and does not in any way limit the present disclosure. Although the present disclosure has been disclosed as above, the above embodiments do not intended to limit the present disclosure. Any person skilled in the art, without departing from the technical solution of the present disclosure, make some changes or modifications to the technical content of the above-mentioned prompts to produce equivalent embodiments with equivalent changes. Any simple modifications, equivalent changes and modifications made to the above embodiments according to the technical essence of the present disclosure that do not depart from the technical scope of the present disclosure shall still fall within the scope of the present disclosure.

What is claimed is:

1. A transformable flying machine, comprising:
   a main body;
   two lift system sets, each of which arranged on one side of the main body and rotatably connected to the main body; and
   a drive mechanism, arranged on the main body and comprising: a driving member and a transmission member; wherein the transmission member is rotatably connected to the two lift system sets, and the driving member is configured to drive the transmission member to move along a direction of a connecting line of centers of the two lift system sets, so as to drive the two lift system sets to rotate, for adjusting a tilt angle of the two lift system sets relative to the main body;
   wherein the transformable flying machine comprises a transmission mating member; each lift system set comprises two rotor assemblies and a connecting rod connecting the two rotor assemblies; the transmission mating member is connected to the connecting rod; the transmission member is in a transmission connection with the transmission mating member, to drive the connecting rod to rotate;
   wherein the transmission mating member comprises a bushing and a first swing arm; the bushing is sleeved on the connecting rod, and the first swing arm is perpendicularly connected to the bushing; the transmission member is connected to the first swing arm to drive the first swing arm to swing, driving the connecting rod to rotate;

wherein an end of the first swing arm is arranged with a first mating shaft parallel to the bushing; an end of the transmission member defines a first elongated groove; the first mating shaft is slidably inserted into the first elongated groove.

2. The transformable flying machine according to claim 1, wherein a guide groove is defined on the main body, the guide groove extending in the direction of the connecting line of centers of the two lift system sets;

the transmission member passes through the guide groove, and the guide groove defines a sliding direction of the transmission member.

3. The transformable flying machine according to claim 1, wherein the transmission member has a first position, a second position, and a third position;

in a state where the transmission member moves to the first position, the two lift system sets tilt in a first direction relative to the main body;

in a state where the transmission member moves to the second position, the two lift system sets tilt in a second direction relative to the main body; and in a state where the transmission member moves to the third position, the two lift system sets are parallel to the main body.

4. The transformable flying machine according to claim 1, wherein a rack is arranged on the transmission member;

the driving member comprises a motor and a gear connected to a rotor shaft of the motor, the gear meshing with the rack;

a rotation of the motor is configured to drive the transmission member to move, so as to adjust the tilt angle of the two lift system sets relative to the main body.

5. A transformable flying machine, comprising:

a main body;

two lift system sets, each of which arranged on one side of the main body and rotatably connected to the main body; and a drive mechanism, arranged on the main body and comprising: a driving member and a transmission member; wherein the transmission member is rotatably connected to the two lift system sets, and the driving member is configured to drive the transmission member to move along a direction of a connecting line of centers of the two lift system sets, so as to drive the two lift system sets to rotate, for adjusting a tilt angle of the two lift system sets relative to the main body;

wherein the transmission member has a first position, a second position, and a third position;

wherein the transformable flying machine further comprises an elastic limit member, and the elastic limit member comprises a first elastic arm and a second elastic arm;

the transmission member comprises a mating convex portion, and the mating convex portion extends between the first elastic arm and the second elastic arm;

in a state where the transmission member moves to the first position, the first elastic arm is in an elastic deformation state;

in a state where the transmission member moves to the second position, the second elastic arm is in an elastic deformation state; and in a state where the transmission member moves to the third position, the elastic limit member is in a deformation recovery state.

6. The transformable flying machine according to claim 5, wherein a magnetic component is arranged on the transmission member;

the driving member comprises two electromagnets arranged on the main body, wherein the two electromagnets are arranged successively at intervals along an extension direction of the transmission member;

upon one of the electromagnets being energized, the one of the electromagnets attracts the magnetic component, causing the transmission member to move to the first position;

upon the other of the electromagnets being energized, the other of the electromagnets attracts the magnetic component, causing the transmission member to move to the second position;

in a state where the two electromagnets are both not energized, the transmission member moves to the third position under an action of the elastic limit member.

7. A transformable flying machine, comprising:

a main body;

two lift system sets, each of which arranged on one side of the main body and rotatably connected to the main body; and a drive mechanism, arranged on the main body and comprising: a driving member and a transmission member; wherein the transmission member is rotatably connected to the two lift system sets, and the driving member is configured to drive the transmission member to move along a direction of a connecting line of centers of the two lift system sets, so as to drive the two lift system sets to rotate, for adjusting a tilt angle of the two lift system sets relative to the main body;

wherein a second elongated groove is defined on the transmission member;

the driving member comprises a steering gear and a second swing arm;

the second swing arm is connected to an output end of the steering gear, and the second swing arm comprises a second mating shaft, the second mating shaft being slidably connected to the second elongated groove.

\* \* \* \* \*